United States Patent [19]

Hoeppel

[11] 4,104,803
[45] Aug. 8, 1978

[54] DIRECTION FINDING DEVICE AND GUIDANCE SYSTEM

[76] Inventor: Raymond W. Hoeppel, P.O. Box 997, Oak View, Calif. 93022

[21] Appl. No.: 756,172

[22] Filed: Jan. 3, 1977

[51] Int. Cl.² ............................................. G01C 17/30
[52] U.S. Cl. ...................... 33/352; 33/1 R; 33/356; 33/361; 335/205
[58] Field of Search .............. 33/355 R, 362, 361, 33/352, 356, 349, 1 R; 324/34 RS

[56] References Cited

U.S. PATENT DOCUMENTS

| | | |
|---|---|---|
| 1,221,738 | 4/1917 | Isom ......................................... 33/352 |
| 3,237,584 | 3/1966 | Keithley, Jr. ....................... 33/363 L |
| 3,252,057 | 5/1966 | Hoeppel ........................... 324/34 RS |
| 3,349,323 | 10/1967 | Mullen ............................. 324/34 RS |
| 3,355,942 | 12/1967 | Freeman ............................. 33/1 R X |
| 3,802,088 | 4/1974 | Barrett et al. ...................... 33/361 X |

Primary Examiner—William D. Martin, Jr.

[57] ABSTRACT

A direction finding device employs a magnetic field sensor utilizing a vibrating magnetic reed switch with adjustable magnetic bias to vary the sensitivity or dead band. By sensing magnetic North, it indicates audibly, visually or by nerve stimulus any departure from a preset course. When attached to a moving object or person it serves as a warning or guidance system.

10 Claims, 9 Drawing Figures

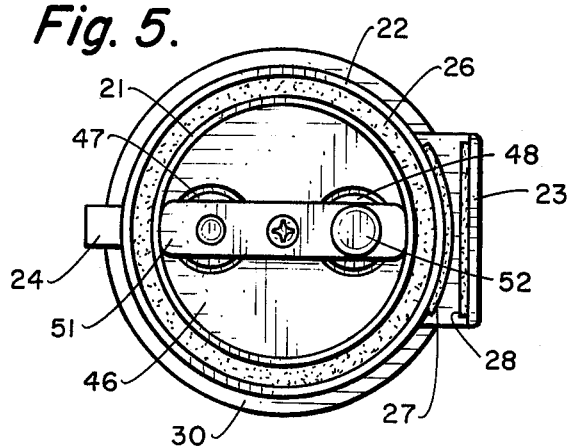
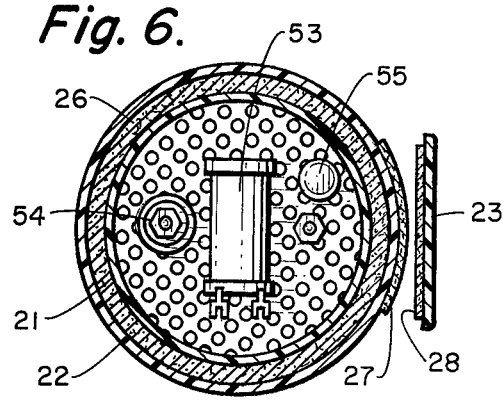
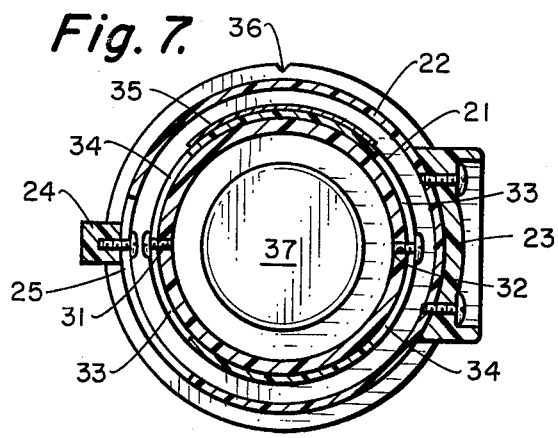
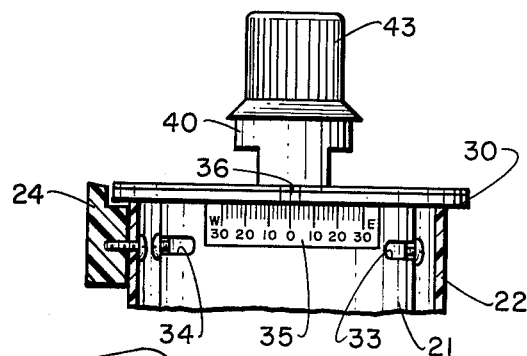
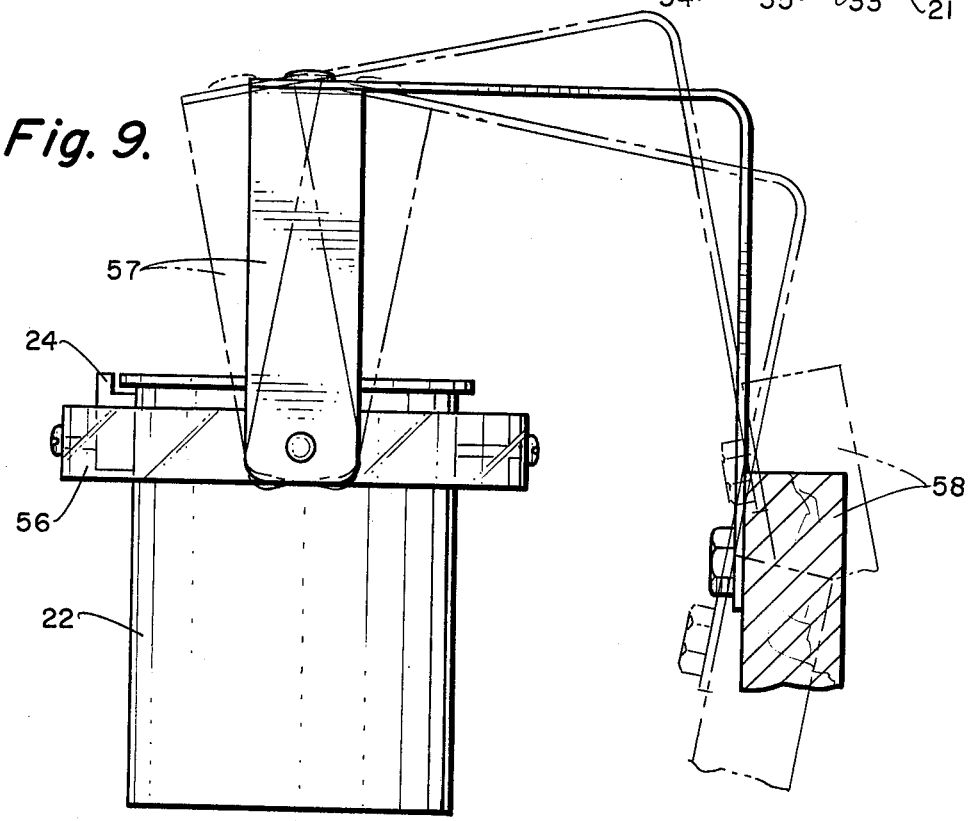

DIRECTION FINDING DEVICE AND GUIDANCE SYSTEM

This device relates to the use of a special type of magnetic field detector to sense the intensity of the earth's magnetic field and to indicate when a preselected polarity of the earth's field is at a maximum or at a minimum as the orientation of the detector is changed by rotating it about an axis or by altering its orientation. When the detector rotates about a framework which is attached to, or may be a part of, a moving object, the orientation of the moving object may be established by noting the relative position of the detector with respect to the framework when a preselected polarity of the earth's field is at a maximum or minimum as indicated by the detector. Thus the position of the detector at a preselected standard intensity of field serves as a reference point from which the orientation of the moving object can be determined.

Except for the magnetic needle compass there are no simple, inexpensive instruments for determining the orientation of a moving object. Nor are there any simple, inexpensive, rapid-responding guidance systems that can signal audibly or visually any departure from a preselected course. Such guidance systems are useful as back up devices to signal a departure from course of boats automatically steered by reference to a wind vane, such as with sailing vessels. Also such guidance systems are useful in guiding a man over a preselected traverse by eliminating the need for surveying a way over the terrain, a slow and laborious process. Such guidance systems will guide a person in complete darkness and have been found to be useful in guiding the blind and for the guidance of searchers in search-and-rescue missions allowing them to devote their entire time to searching rather than to have them spend any valuable time in surveying their preset course.

Objects of this invention therefore are to provide a simple inexpensive guidance system to produce an alarm when a vessel departs from a pre-established course, and when attached to a man, such as by his belt, to guide him in any type of weather or darkness along any direction he selects. Another object is to provide a direction finder that responds rapidly, in contrast to the slow response of a swinging compass needle. Another object is to provide a direction finder that can relate to true North rather than to magnetic North as with most compasses having needle indicators.

In the drawings,

FIG. 5 is a bottom view of the instrument showing the batteries, switch and battery strap.

FIG. 6 shows a top view of the section labeled 6 in FIG. 4, showing the position of the reed relay, circular bias magnet and capacitor.

FIG. 7 shows a bottom view of the crossection labeled 7 in FIG. 4 showing the transducer and slots in the inner tube for adjustment of the declination adjustment.

FIG. 8 is a side view of the upper portion of the instrument with the outer tube not shown in front to show the position of the declination label on the inner tube and the means of adjustment for the declination correction.

FIG. 9 is a side view of the instrument suspended by means of a gimble to the bulkhead of a boat, wherein three positions of the gimble are shown as the boat rocks sideways.

The magnetic field detector used in this direction finding device is fully described in the inventor's patent, U.S. Pat. No. 3,252,057. One useful embodiment will be described herein but other embodiments of this patent are useful in this invention.

Figure 1:
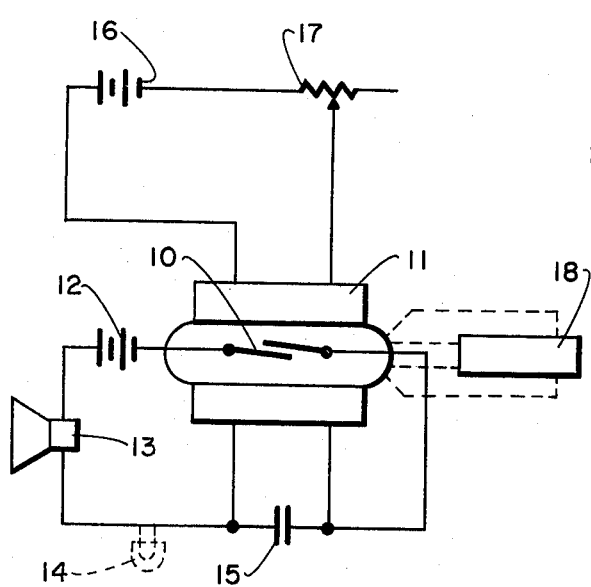
FIG. 1 shows one of the types of circuitry that might be employed in the magnetic field detector used in the direction finder of this invention.

Referring to FIG. 1, a dual coil magnetic reed relay comprising a magnetic reed switch, 10, and a solenoid, 11, is connected in circuit with a battery, 12, a loudspeaker, 13, a lamp, 14 and a capacitor, 15, so that the contacts of the reed switch control the current through the one winding of the solenoid. The second winding of the solenoid, 11, is connected in series with a battery, 16, and a variable resistor, 17, to provide variable magnetic bias. A second source of magnetic bias is permanent magnet, 18, which is in flux coupling relationship with the switch.

In operation, magnetic bias is provided to maintain the contacts of the reed switch in a barely closed condition, this bias opposing the bias produced by the solenoid winding connected in circuit with the reed switch. When the switch is closed, current flows through its contacts, actuating the first winding of the solenoid, producing a magnetic flux that must oppose the resultant bias produced by the second winding and by the permanent magnet, which in turn causes the switch contacts to open. This operation is then repeated continually, causing the switch contacts to open and close in a vibrating manner. The capacitor is necessary to retard the rate of vibration of the switch, as it has been found that the switch becomes most sensitive to external magnetic fields when it is vibrating slowly. As the magnetic field is reduced, or as the amount of bias is reduced, the vibration rate decreases. It is thus desirable to adjust the bias to a point where the switch is either vibrating slowly or is on the verge of vibration. This can be done by varying the current through the second winding of the solenoid or by moving the permanent magnet with respect to the switch.

In other embodiments, it is obvious that the second winding of the solenoid may be replaced with a magnet which is movable with respect to the switch and which thus affords a controllable bias. Also the reed switch can be a double throw type with the normally closed contacts controlling the current through the solenoid, in which instance the external bias serves to reduce the spring tension holding the normally closed contacts closed.

At maximum sensitivity a slight change in the direction of the major axis of the switch with respect to the earth's magnetic field will change the rate of vibration of the switch. One end of the switch will be found to be sensitive to a north polarity and the other end to a south polarity, the maximum effect being noted when the major axis of the switch is aligned with the lines of flux from the earth.

When the switch vibrates, current flows through the sound transducer, 13, and the lamp, 14, producing a ticking sound and flashes of light, these elements serving as transducers to indicate the state of vibration of the switch. Any one of these transducers may be used alone, and when it is desirable not to produce external sound or light, the primary of a step up transformer may be substituted for either of these transducers, the high voltage secondary being used to produce electrical shock by means of electrodes applied to the skin of a man. Among the useable light transducers are incandescent, diode-type and glow lamps.

It is necessary to have at least one variable source of bias in flux-coupling relationship with the reed switch. This can be attained by using a solenoid carrying a contollable curent as shown in FIG. 1 or by moving a permanent magnet with respect to the switch in which instance the second winding of the solenoid is not needed. One convenient method of accomplishing this is to mount a circular permanent magnet near the switch so that it may be turned about one axis, with the magnet magnetized in a direction transverse to this axis. Then, as the magnet is turned it first presents one pole toward one end of the switch and on further turning 180° presents the other pole. Thus a wide range of bias flux is produced on turning the magnet.

It is usually desirable to use more than one magnet as the bias source, especially where a vernier adjustment is desired. Thus one magnet located close to the switch furnishes most of the bias and a second magnet located further away serves as a vernier adjustment, enabling a critical adjustment to be made with ease.

Since the reed switch detector responds to the intensity of the earth's field rather than to its direction, as with a needle compass, the rate of vibration of the switch will vary as the position of the major axis of the switch is inclined in the vertical plane to co-incide with the inclination of the magnetic dip needle. In North America this inclination varies between 60° and 80°, and reduces to about zero at the equator. In the use of the instrument it is desirable to maintain the switch in a fixed position with respect to the horizontal in order to avoid re-adjustment of the bias. This can be done by manually adjusting its position by means of a bubble level usage or by maintaining the switch in a fixed plane with respect to the earth by suspending it by means of a gimble. To reduce the effect of tilting in the vertical plane on the vibration rate of the switch, the major axis of the switch can be maintained in a position that parallels the angle of the dip needle. A slight change in inclination of the switch will then produce only a slight change in the earth's flux at the switch, whereas if the switch is operated in a horizontal plane, a change in inclination will produce a larger change in the earth's effective flux at the switch.

When the bias magnets used are located in such position that their resultant flux does not align with the major axis of the switch it will be found that the rate of vibration of the switch with a fixed external field, will vary as the switch is rotated about its minor axis. Moreover this rotation will distort the earth's field at the switch, resulting in errors in its ability to consistently sense magnetic North. It is thus desirable to align the bias magnets so that their resultant field coincides with the field of the solenoid and with the major axis of the switch.

It is often inconvenient to so align the bias magnets, in which instance it is important in the use of the detector to keep the switch-bias combination in a fixed position with respect to the horizontal plane of the earth at all times when the device is used for guidance or for direction finding. Here again this can be done by reference to a bubble level, or by suspending the instrument by means of a gimble.

In the guidance system of this patent, the reed relay and bias sources are mounted in a fixed position on a framework, which most conveniently can be within a circular tube. The other components of the circuitry can be located at a distance from the relay and bias sources, but any ferromagnetic components must be far enough removed from the relay and bias sources that they will exert no effect on the flux produced at the relay by the bias source as the framework is moved with respect to these other components. However any ferromagnetic components can be located close to the relay and bias sources on the framework provided they remain in a fixed position with respect to the relay and bias sources. Components that might be ferromagnetic are batteries, transducers and transformers. At least one of the bias sources must be adjustable with respect to the flux produced at the relay. This can be accomplished by varying a current in a solenoid located near the switch or by moving a magnet with respect to the switch.

When a proper bias is established, the vibration rate will increase as one end of the relay is directed towards the south and will decrease in vibration rate as this end is directed north. In one method of operation the bias is adjusted so that the relay is on the verge of vibration, with contacts open when its major axis is aligned with the earth's field and one end is facing north. Then on rotating the relay slightly so that its axis is only a few degrees out of alignment with this field, it will begin to vibrate. This vibration will occur regardless of the direction of movement about its axis, the non-vibrating position thus serving as a reference point to indicate any direction desired with respect to magnetic north.

Alternately the bias may be adjusted so that the relay just begins to vibrate when one end of its major axis is facing magnetic north and when the axis is moved a few degrees in either direction it will stop vibrating. Again a reference point is established for the determination of direction. Likewise, adjustments may be made with reference to magnetic south rather than north.

The sensitivity of the instrument may be readily adjusted by varying the bias. This sensitivity, or dead band, where the compass is operated in the silent mode, can be varied from about plus or minus 5° each side of the desired direction, to as much as 30° to 40° or more. It is often undesirable to have the sensitivity too great, especially if used by a man, but it will be found that the overall accuracy on a traverse will usually be well within the sensitivity selected because of compensating errors.

In order to use the instrument to guide an object on a desired bearing, it is necessary to arrange to have the relay-switch combination rotatable about an axis on another framework to which is attached an index reference point. The framework being attached to the moving object or being a part of the moving object. To establish a bearing it is desirable to attach to either framework a fixed legend or azimuth circle, showing the various points or degrees of the compass. On the other framework is attached a fixed index in proximity to the legend, so that the degree of rotation of the first framework, housing the relay-bias combination, with respect to the other framework, attached to the moving object, can be determined. It is most convenient to house the relay-bias combination within a cylindrical tube and rotate this tube within an outer tube, the legend being usually attached to the inner tube and the index to the outer tube. For stability and durability, the relay and at least one of the major bias sources can be potted within the inner tube.

If the instrument is to be used only to locate one direction, such as true north or magnetic north, the second framework need not be used and either a legend or index is then mounted on the first framework to establish the orientation of the framework with respect to magnetic north. The device would then serve as a compass to establish one desired direction, and from this direction all other directions can be determined by reference to the legend or azimuth circle, as with a compass.

Since magnetic north normally does not co-incide with true north, deviating as much as 30 or more degrees east or west of true north, this declination can be compensated for by providing a means to rotate the tube containing the reed switch with respect to the moving body to which the guidance instrument is attached. This can be done by providing for the manual displacement of the tube containing the switch with respect to the legend or index or by displacement of the second framework with respect to the moving body being guided. A legend can be provided to indicate the number of degrees of displacement to compensate for the declination of the compass.

When used as a guidance system it is necessary to attach the second framework to the body being guided. Where the instrument is to guide a man, one method of attachment is by use of a belt clip to fasten to his belt, the best position being just over the forward projection of the right hip bone.

In marine applications, where the boat is subject to considerable sway, it is best to mount the second framework to a bulkhead by means of a gimble, which will maintain the sensing switch and bias source always in a fixed position with respect to the horizontal.

One application of one of the embodiments of this invention will be fully described, but it must be realized that many other designs are possible incorporating the various embodiments of this invention.

Figure 2:
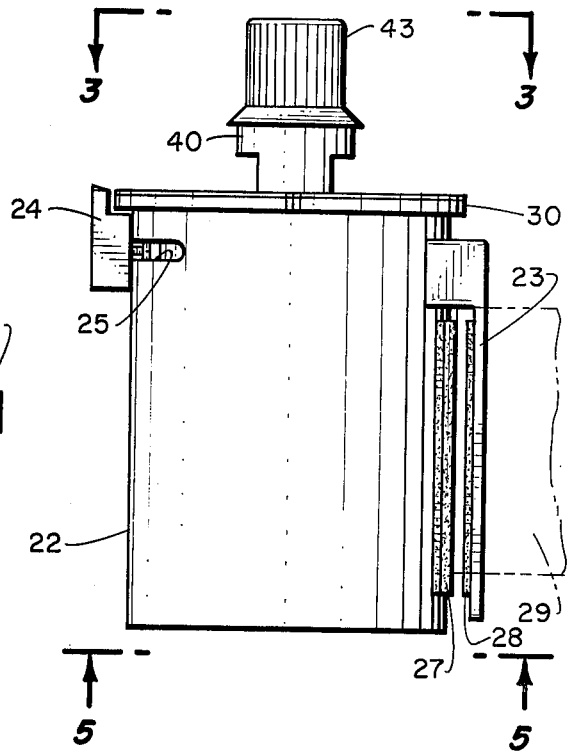
FIG. 2 is a side view of the exterior of a direction finder wherein the belt clip and index are shown.
Figure 3:
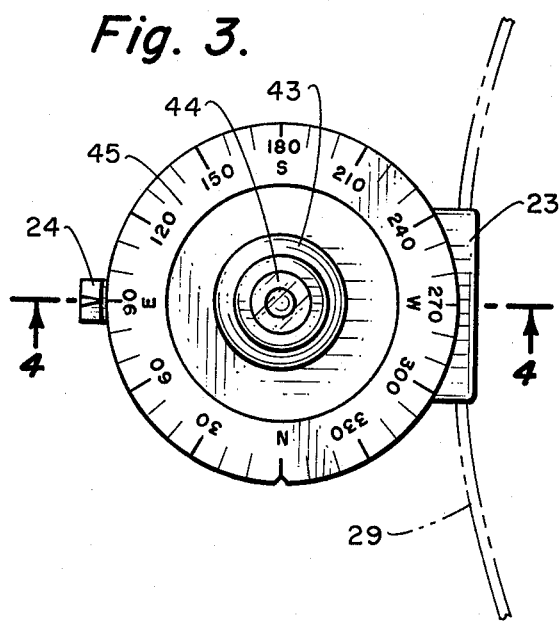
FIG. 3 is an exterior top view of the instrument showing the upper portion of the belt clip, the belt, the top reference dial, the index and the bias control knob with its circular level.
Figure 4:
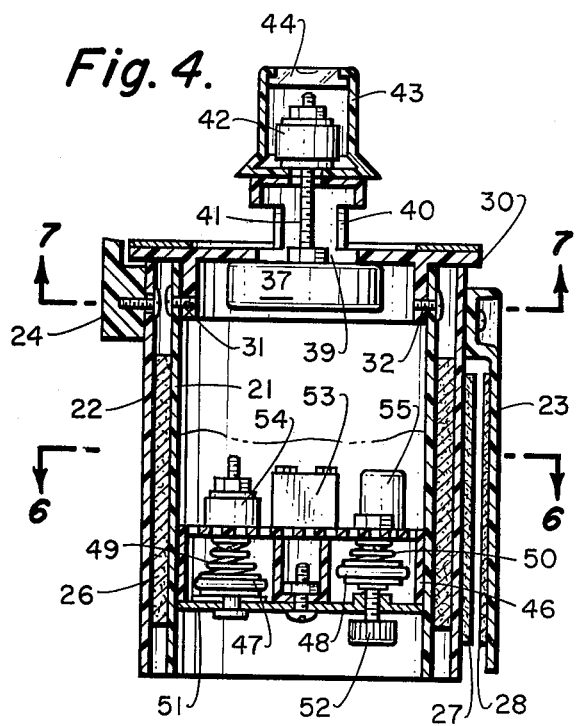
FIG. 4 is a cross-section of a side view through section 4 of FIG. 3, showing most of the components of the system.

Referring to FIGS. 4 and 6, all working components of the direction finder are housed within and attached to an inner tube, 21, which rotates within an outer tube, 22 (FIGS. 4 and 6). The outer tube is attached to a man's belt, 29, (FIG. 3) by means of a belt clip, 23, which is an integral part of the outer tube. A moveable index, 24, is attached to the outer tube by means of a screw (FIG. 4). A slot, 25, in the outer tube (FIGS. 2 and 7) enables the index to be positioned over about 45 degrees of arc. The purpose of this adjustment will be explained later. A foam rubber spacer, 26, (FIGS. 4, 5 and 6) separates the two tubes, providing enough friction to hold the inner tube in a fixed position within the outer tube so that it may not be accidentally rotated. A rough surfaced material, 27 and 28, (FIGS. 4 and 6) is attached to the inside surfaces of the belt clip and affords friction to prevent the belt clip from slipping on the belt.

The top assembly is mounted on a top cover, 30, which can rotate within the inner tube and which is attached to the inner tube by means of two screws, 31 and 32, (FIG. 4). Two slots, 33 and 34, (FIGS. 7 and 8) near the top of the inner tube, hold the top cover in a fixed position during use but permit the top cover to be rotated about 60° within the inner tube to enable a compensating adjustment for the declination of the compass. The degree of this adjustment is established by a declination legend, 35, and an index mark, 36, on the upper cover (FIG. 8).

Firmly attached to the underside of the top cover, 30, is a sound transducer, 37, (FIGS. 3, 4, and 7) which speaks through a slot, 39, in the top cover (FIG. 4), and which is shielded from the weather by a sound cap, 40, with openings on its sides to permit sound to pass through (FIGS. 4 and 8). A screw (41) attached to the center of the transducer, holds a circular permanent magnet, 42, which is magnetized across its diameter, above the top of the sound cap (FIG. 4). This magnet can be manually rotated by means of a knob, 43, attached to its perimeter (FIG. 4). A circular bubble level, 44, is housed within the top of the control knob, 43. This enables the instrument to be kept in a horizontal position on the belt. Attached to the top of the top cover is an azimuth circle legend, 43, (FIG. 3). The outer perimeter of the top cover serves as a dial to adjust the bearing. This completes the top assembly.

The bottom cover, 46, (FIGS. 4 and 5) houses two batteries, 47 and 48, which are held in place by contact springs, 49 and 50, (FIG. 4), which communicate with the detector components mounted above. A metallic battery strap, 51, (FIGS. 4 and 5) interconnects the plus and minus terminals of the other side of the batteries, and a non-metallic thumb screw, 52, acts as a switch to disconnect one side of the battery strap from contact with one of the batteries by pushing one battery away from the battery strap.

Just above the batteries are mounted within the inner tube, the relay, 53, the capacitor, 55, and a cylindrical permanent magnet, 54, which is magnetized across its diameter, and which provides the major bias for the system (FIG. 4 and FIG. 6). After proper adjustment of the bias, these three components are potted securely within the inner tube.

In use, if it is desired to relate all directions to true north rather than magnetic north, screws, 31 and 32, are temporarily loosened and the top cover is rotated to a point as indicated on the scale, 35, to the magnetic declination for the area in which the device is to be used. The instrument is then slipped on the belt of a person at a point just ahead of the forward projection of the right hipbone and leveled by reference to the circular level. In the event the instrument cannot be levelled in this position, it is moved to the right or left along the belt until it can be leveled. In its final position it is essential that the projection of a line between the center of the instrument and the index, point straight ahead. If this is not the case, the index, 24, should be moved to a new position via slot, 25, and fastened securely.

A bearing is then set on the instrument by rotating the upper dial, which in turn moves the inner tube within the outer tube. Thumb screw, 52, is then loosened permitting a battery contact to be made and setting the relay in vibration, as indicated by a ticking sound coming from the transducer. The top knob is then turned, which in turn moves the verneer bias magnet, 42, until the sound just ceases. Then the person walks ahead, correcting his course any time he hears a ticking sound. The direction of this correction is readily determined by merely swinging the hips to the right or left. Once a course is set, the person can walk as fast as desired even in darkness without looking at the instrument and without using his hands, and be assured that he will be guided quite accurately on his way.

When used in a boat, the instrument should be mounted on a gimble, as in FIG. 9, to assure that it remains in a fixed position with respect to the horizontal at all times. Here, the outer tube, 22, is pivoted to a ring, 56, which in turn is pivoted to a bracket, 57, which in turn is attached securely to a bulkhead, 58.

Although this invention is described by means of embodiments shown in the drawings, yet various modifications can be made without departing from the scope of the following claims.

What is claimed is:

1. A direction detecting assembly comprising a magnetic reed relay, said relay comprising a magnetic reed switch in flux coupling relationship with a solenoid, said relay being mounted rigidly on a first given framework; at least one source of magnetic bias affixed to said first given framework in flux coupling relationship with said relay; externalmeans to control at least one said source of bias; a power source; capacitive means; and electrical transducer means to indicate when switch contacts operate; said switch and solenoid being connected in circuit with said power source, capacitive means and transducer means so that the current through said solenoid and transducer means is controlled by the contacts of said switch, the flux from said solenoid opposing the flux produced by said source of bias, thus causing said switch to open and close in a vibrating manner at a rate proportional to the component of the earth's magnetic field in a direction generally parallel to the major axis of said switch, said transducer indicating the state of vibration of said contacts; position indicator means attached to said first given framework to indicate the relative orientation of said framework with respect to magnetic North; means to manually adjust the relative position of said position indicator means with respect to the major axis of said switch, so that the orientation of said first given framework will relate to true North rather than to magnetic North; and means to enable the maintainance of the major axis of said switch in a fixed position with regard to the horizontal plane of the earth at all times.

2. A direction detecting assembly according to claim 1, wherein said first given framework rotates about a point on a second given framework, said second given framework being attachable to a moving body, and angular position means to indicate the degree of rotation of said first given framework with respect to said moving body.

3. A direction detecting assembly according to claim 1, wherein said capacitive means, power source and transducer are mounted on said first given framework.

4. A direction detecting assembly according to claim 1, wherein any ferromagnetic components other than said relay and magnetic source of bias are located external to said first given framework and in a position enough removed from said relay and bias source that they will not alter the magnetic field between said relay and bias source regardless of the relative position of said first given framework with respect to said ferromagnetic components.

5. A direction detection assembly according to claim 1, wherein said source of magnetic bias comprises at least one cylindrical permanent magnet magnetized across its diameter and rotatable about its center on an axis perpendicular to its magnetic field.

6. A direction detecting assembly according to claim 2, wherein said assembly is used for guiding a human being, said second given framework being firmly attached to the wearer's belt by means of a belt clip, means to adjust the relative position of said position indicator means with respect to said belt clip, and level indication means to enable the wearer to keep said assembly in a fixed position with regard to the horizontal plane of the earth at all times regardless of the direction of travel of said wearer.

7. A direction detecting assembly according to claim 1, wherein gimble means is used to attach said assembly to a moving object, said gimble means holding said first given framework in a fixed position with respect to the horizontal plane of the earth regardless of the attitude of the moving object.

8. A direction detecting assembly according to claim 2, wherein gimble means is used to attach said second given framework to a moving object, said gimble means holding said second given framework in a fixed position with respect to the horizontal plane of the earth regardless of the attitude of the moving object.

9. A direction finding assembly according to claim 1, wherein said solenoid and said source of bias are mounted in such position with respect to said switch that the resultant lines from said solenoid and bias source lie parallel to and coincident with the major axis of said switch.

10. A direction finding assembly according to claim 1, wherein said switch is mounted on said framework in such position that the major axis of said switch aligns with the magnetic lines of force of the earth when the assembly is in its normal operational position.

* * * * *